(12) United States Patent
Edwins

(10) Patent No.: US 9,427,109 B2
(45) Date of Patent: Aug. 30, 2016

(54) GRILL ROD SCRAPING TOOL AND RELATED METHODS

(71) Applicant: John Edwins, Del Mar, CA (US)

(72) Inventor: John Edwins, Del Mar, CA (US)

( * ) Notice: Subject to any disclaimer, the term of this patent is extended or adjusted under 35 U.S.C. 154(b) by 416 days.

(21) Appl. No.: 14/067,850

(22) Filed: Oct. 30, 2013

(65) Prior Publication Data

US 2015/0096592 A1 Apr. 9, 2015

Related U.S. Application Data

(63) Continuation-in-part of application No. 29/469,308, filed on Oct. 9, 2013, now Pat. No. Des. 732,255.

(51) Int. Cl.
*A47J 37/07* (2006.01)
*B08B 1/00* (2006.01)

(52) U.S. Cl.
CPC ............ *A47J 37/0786* (2013.01); *B08B 1/005* (2013.01)

(58) Field of Classification Search
CPC .... A47J 37/0786; A47J 43/28; A47J 43/283; A47J 43/288
See application file for complete search history.

(56) References Cited

U.S. PATENT DOCUMENTS

| | | | | |
|---|---|---|---|---|
| 2,658,730 A | * | 11/1953 | Mignolet | A47J 43/288 30/142 |
| 3,820,185 A | * | 6/1974 | Phillips | A47J 43/28 15/105 |
| D242,687 S | * | 12/1976 | Broberg, Jr. | D32/49 |
| 4,668,302 A | * | 5/1987 | Kolodziej | A47J 37/0786 134/6 |
| 6,000,739 A | * | 12/1999 | Zemit | A47J 45/10 126/25 R |
| 2006/0150358 A1 | * | 7/2006 | Bongiovanni | E04F 21/162 15/235.4 |

* cited by examiner

*Primary Examiner* — Nicole Blan
(74) *Attorney, Agent, or Firm* — Buche & Associates, P.C.; John K. Buche; Bryce A. Johnson

(57) ABSTRACT

A grill rod scraping tool for cleaning the top, sides and bottom side of grill rods. The tool comprises of a neck with concave contours and a U-shaped end that enable the prongs and scraper of the tool to scrape the top, sides, and bottom side of the grid iron rods. The concave contours of the neck also allow both left and right handed individuals to operate and rotate the tool with ease. The prongs are angled away from the neck to enable the tool to be used while the grid iron rods are still hot. The grill tool is applied to the grill rod and pushed and pulled along the length of the grill rod to clean residue from food and hardened char.

10 Claims, 4 Drawing Sheets

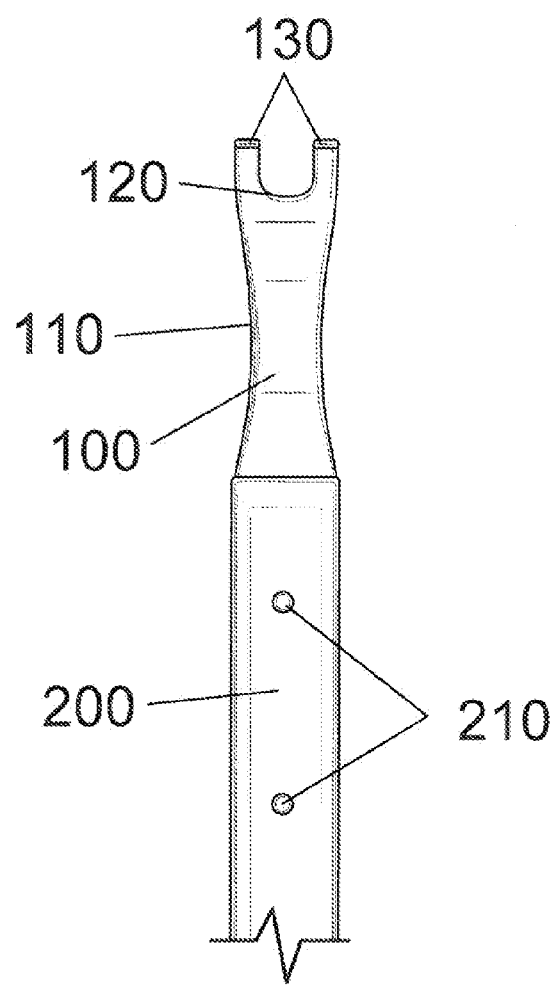
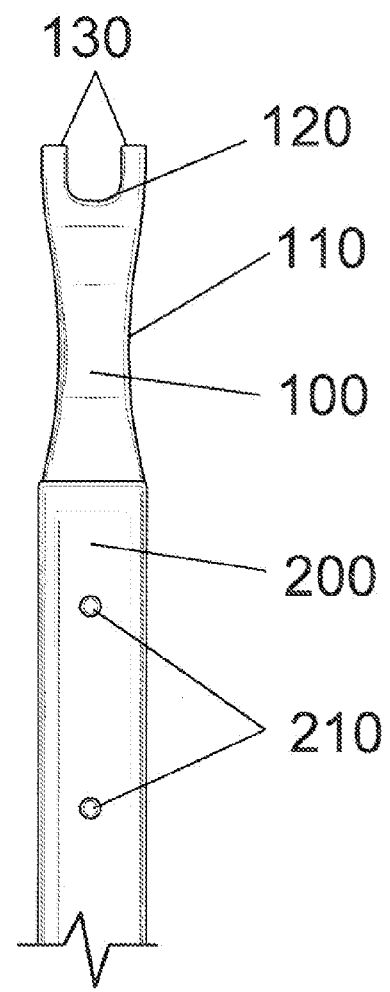
FIG. 2　　　　　FIG. 3
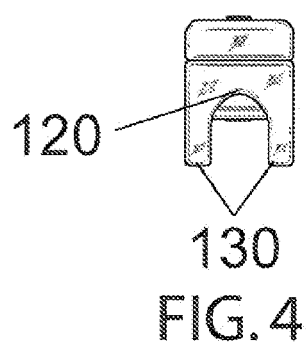
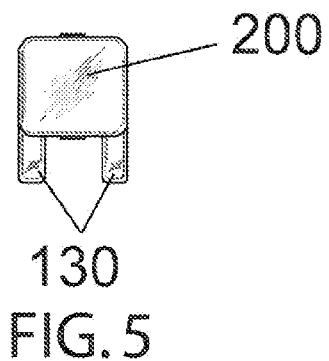
FIG. 4　　　　　FIG. 5

GRILL ROD SCRAPING TOOL AND RELATED METHODS

CROSS-REFERENCE TO RELATED APPLICATIONS

This application claims priority to U.S. Des. patent application Ser. No. 29/469,308 (filed Oct. 9, 2013) entitled "Design for a BBQ grill rod cleaner tool."

STATEMENT REGARDING FEDERALLY SPONSORED RESEARCH OR DEVELOPMENT

Not applicable.

BACKGROUND OF INVENTION

1. Field of the Invention

The subject matter of this disclosure is in the field of apparatus for cleaning and/or scraping grill rods, and related methods.

2. Background of the Invention

Grid irons, in cooking vernacular, are a metallic grates that are typically defined by an array of parallel bars or rods, sometimes known as grill rods. When used for cooking, a grid iron is positioned above or below a heat source while food stuffs are positioned on the grill rods of the grid iron for cooking. In practice, residue of food stuff, including char, can remain adhered to surfaces of the grill rods after use. Residual food stuff can be problematic during later uses of the grill rods because the residue can contaminate subsequent food preparations and, as a result, affect flavor or cause illness to consumers of subsequent preparations. Thus, a need exists for apparatus and related methods of cleaning grill rods.

A variety of apparatus exist for cleaning grill rods. Most of such apparatus operate by scraping the tops of grill rods to remove residue and char. Sometimes scraping is accomplished via brushes with stiff bristles (e.g., metal brushes), but these brushes either (i) do not adequately eliminate hardened char and hard residues or (ii) have bristle failure rapidly. Apparatus for cleaning grid irons have also employed various types of scraping blades, but blades are not entirely satisfactory for cleaning grill rods because the sides and bottom side of a grill rod are not cleaned without turning the grid iron over because the action of twisting the tool around the grill rod results in a conflict between the cleaning apparatus and the other grill rods of the grid iron grate. In view of the foregoing, a need exists for apparatus and related methods of cleaning grid irons where the apparatus is sturdy and rigid enough to eliminate hardened char and residue from the top, sides, and bottom of the grill rods, without having to cool down and overturn the grid iron plate.

Others have attempted unsuccessfully to solve the problem of the present application. For example, U.S. Pat. No. 5,255,406 (Rood) is only able to clean the top of grill rods unless the user turns the grid iron over on to the other side. U.S. Pat. No. 4,241,342 (Amundsen) can only be used while the grid iron is cool and scraper only fits two grill rod sizes. U.S. Pat. No. 7,275,278 (Martin et al.) cannot be used to clean the bottom side of the grill rod without lifting and overturning the entire grid iron. U.S. Pat. No. 4,958,403 (Martin) only employs a scraper that fits two grill rod sizes and the tool is inhibited by adjacent rods, which renders the tool difficult to rotate. The apparatus disclosed in U.S. Pat. No. 3,820,185 (Phillips) is not adequate for many grill rod cleaning situations. The twist in the blade of the apparatus limits the use of the same to one-hand. Moreover, the apparatus is not suitable to be used on grill rods of many sizes. Furthermore, the orientation of the scrapping surface requires a close proximity between a user's hand and the grid iron, which renders the cleaning of hot grid irons difficult. As a result, a need still exists for apparatus and related methods of cleaning all sides of a hot or cold grid iron rod.

SUMMARY OF THE INVENTION

Accordingly, it is an object of the present application to provide a grill rod scraping tool that allows a right or left handed user to clean the entire circumference of a grill rod.

It is another object of the present application to provide a grill rod scraping tool that cleans a grill rod of hardened char.

It is another object of the present application to provide a grill rod scraping tool that can be safely used while the grill rods are hot.

It is another object of the present application to provide a grill rod scraping tool that can be used on a wide variety of grill rod sizes.

In one embodiment, the disclosed apparatus comprises a handle and a neck. The neck has a concave contour and a "U-shaped" end defined by two prongs. In a preferred embodiment, the neck features a concave contour along either side to allow a user to clean an entire grill rod, without interfering with adjacent grill rods, by rotating the tool along a broad range of angles while scraping the grill rod. Suitably, the neck's concave contours further permit a right or left handed use with equal effectiveness. In one embodiment, the prongs are directed at an angle in a range of one-hundred and twenty degrees to one-hundred and seventy degrees away from the neck, with a still more preferable angle of approximately one-hundred and forty-five degrees away from the neck, allowing a user to clean a hot grill rod without having his or her hand too close to the grilling heat.

BRIEF DESCRIPTION OF THE FIGURES

The manner in which these objectives and other desirable characteristics can be obtained is explained in the following description and attached figures in which:

FIG. 2 is a front view of grill tool of FIG. 1 featuring a neck 100, prongs 130, scraper 120, concave contour 110, a handle 200, and fasteners 210;

FIG. 3 is a back view of grill tool of FIG. 1 featuring a neck 100, prongs 130, scraper 120, concave contour 110, handle 200, and fasteners 210;

FIG. 4 is a top view of the grill tool of FIG. 1 featuring prongs 130, scraper 120, and a handle 200;

FIG. 5 is a bottom view of the grill tool of FIG. 1 featuring prongs 130 and a handle 200;

It should be noted that the figures are merely for illustrative purposes and depict only preferred embodiments of the disclosed apparatus or methods. Also, drawings are not necessarily made to scale.

DETAILED DESCRIPTION OF THE INVENTION

Generally disclosed is a grill rod scraping tool. Operably, the grill rod scraping tool may be applied to grill rods and pushed and pulled along the length of the grill rods to scrape and clean the grill rods. Suitably, the grill rod scraping tool may be (1) used to clean the top, bottom side, and sides of grill rods, (2) used with either the left or right hand, and (3) used while the grill rods are still hot or cool.

Figure 1:
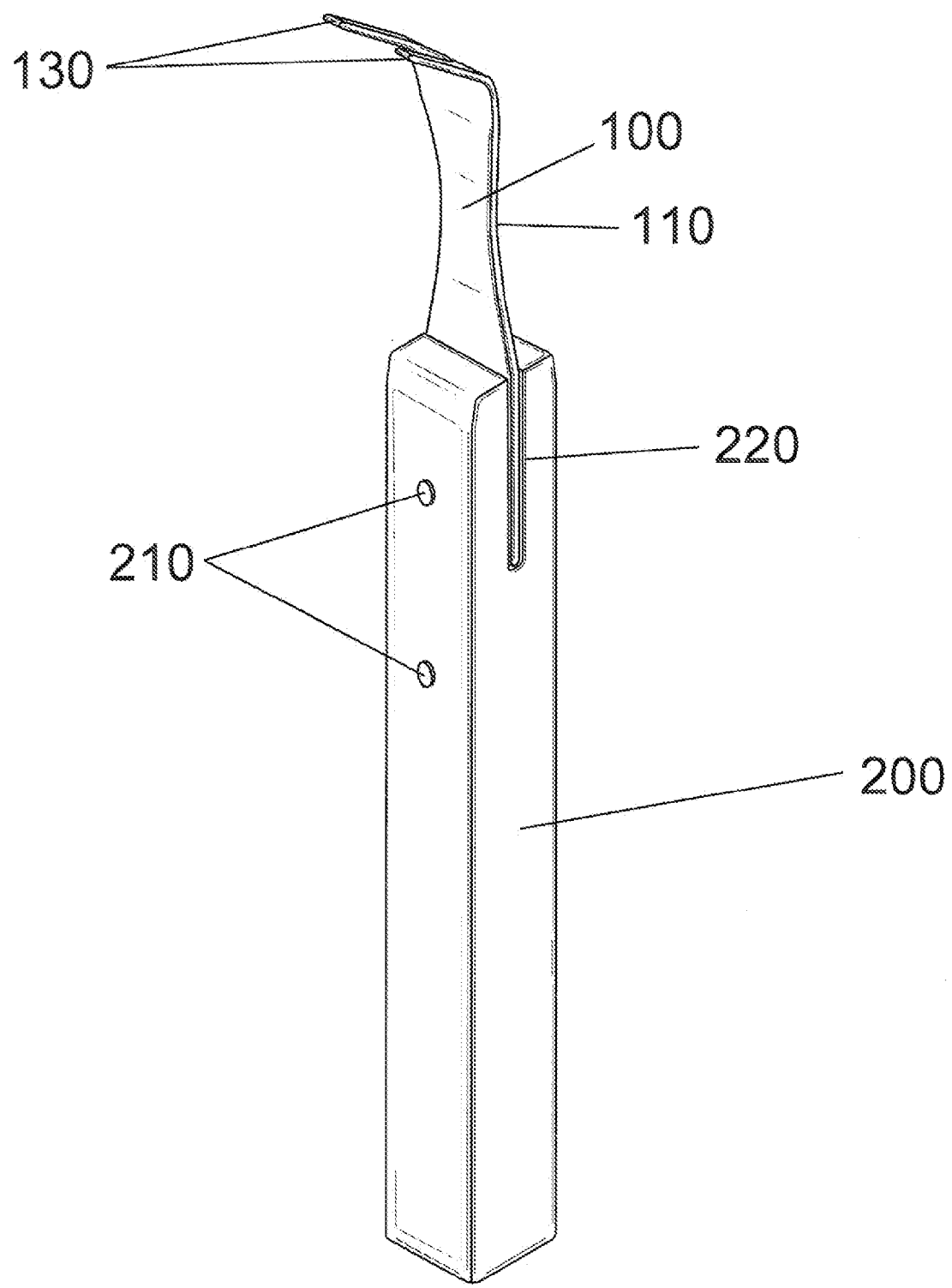
FIG. 1 is a perspective view of a grill tool featuring a neck 100 with prongs 130 and concave contours defined on the neck.

FIG. 1 is a perspective view of one preferable embodiment of the grill rod scraping tool. As shown in the figure, this embodiment comprises a neck 100 that is securely affixed to a handle 200. The neck 100 sometimes sits inside a slot 220 at the top of the handle 200. The neck 100 may be affixed to the handle 200 by two fasteners 210. The fasteners 210 may be screws or any other suitable mechanical device that affixes two items of hardware. The neck 100 culminates with a U-shaped design comprising of prongs 130 and a scraper 120 that are angled approximately one-hundred and forty-five degrees away from the neck 100.

Figure 7:
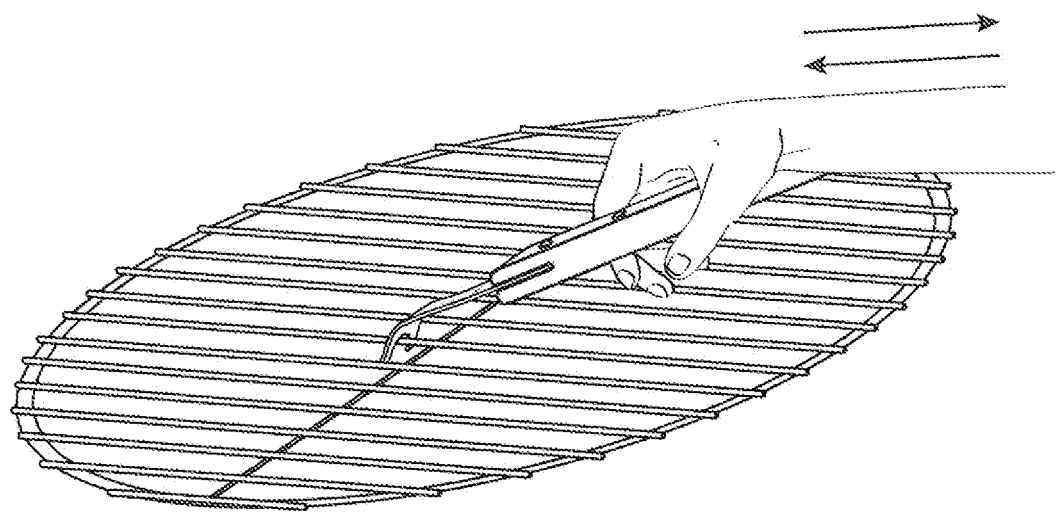
FIG. 7 is an environmental view of a user applying the grill tool to a grill rod and pushing and pulling the tool along the length of the grill rod.

FIG. 2 depicts a front view of one preferable embodiment of the invention. The grill rod scraping tool may be used with either hand to scrape food deposits and hardened char off of the grid iron rods. In use, as shown in FIG. 7, the user applies the prongs 130 over the grill rod, places the scraper 120 in contact with the top of the grill rod, applies force to the handle 200, and pushes or pulls the handle 200 along the length of the grill rod. Residue is released from the rod and yet, unlike a brush, the tool is not damaged or worn out and easily used numerous times.

Figure 8:
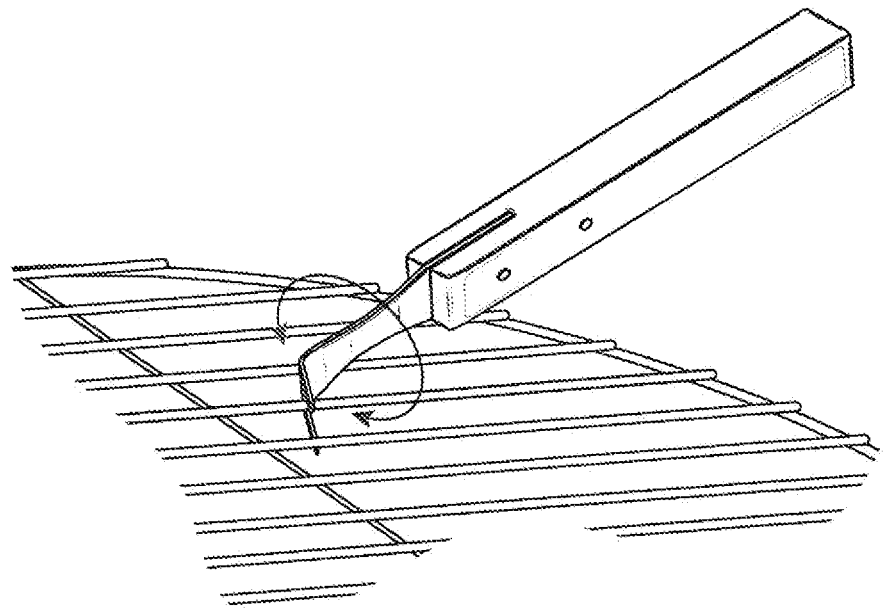
FIG. 8 is an environmental view of a user applying the grill tool a grill rod and rotating the grill tool to either side of the grill rod in order to facilitate cleaning the sides and bottom side of the grill rod.

As shown in FIG. 2, the concave contours 110 on the neck 100 allow the user to rotate the grill tool that is in contact with a grill rod without interference from the adjacent grill rods. As shown in FIG. 8, the concave contours 110 on the neck 100 also allow the user to rotate the grill tool, with either the left or right hand, to the left or right at approximately forty-five degrees so that the scraper 120 is in contact with the side of the grill rod and the prongs 130 are in contact with the top and bottom side of the grill rod. The user then pushes or pulls the handle 200 along the length of the grill rod to scrape food stuffs and hardened char off of the sides and bottom side of the grill rod.

FIG. 3 is a back view of the grid iron scraping tool with a full view of the prongs 130 and scraper 120. The prongs 130 are positioned sufficiently apart so that they may conveniently be placed around a grill rod of many sizes. The concave contour 110 allow the grill tool to be rotated along a broader range of angles in order for the prongs 130 and scraper 120 to reach the sides and bottom side of the grill rod.

FIG. 4 is a top view of the grill cleaning tool with an overhead view of the prongs 130 and its relation to the handle 200.

FIG. 5 is a bottom view of the prongs 130 and the handle 200 that is configured in a square.

Figure 6:
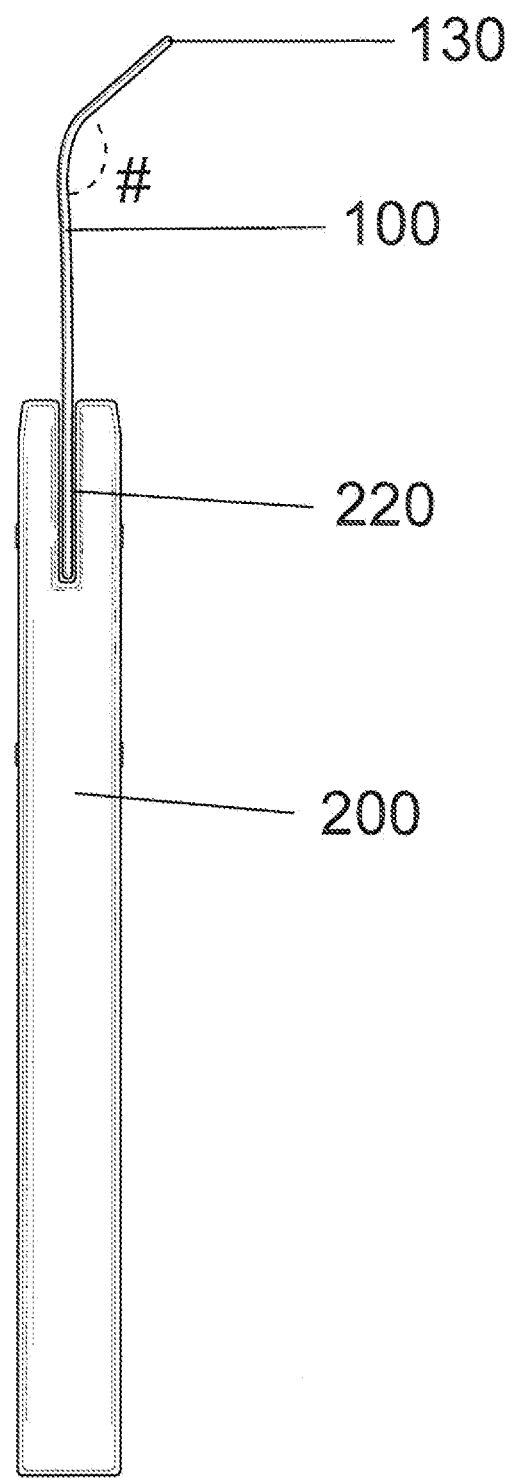
FIG. 6 is a side view of a neck 100, prongs 130, slot 220, a handle 200, and an angle # with a range of one-hundred and twenty degrees to one-hundred and seventy degrees.

FIG. 6 is a side view of the handle 200, slot 220, neck 100 and prongs 130. As seen in the figures, the neck 100 is inserted through the slot 220 and into the handle 200. In another embodiment the handle 200 may be an extension of the neck 100 and uniformly constructed from the same material as the neck 100. The prongs 130 are preferably angled down and away from the neck 100 at approximately one-hundred and forty-five degrees. Operably, the angle of the prongs 130 away from the neck 100 allows the grid iron scraping tool to be applied and used while the grid iron is emanating heat because the angle positions the hand holding the handle away from the grid iron, as opposed to a prongs that feature a ninety degree angle, wherein the hand would be too close to the grid iron and encounter uncomfortable heat.

In any preferable embodiment, the neck 100, prongs 130, and scraper 120 are preferably composed of stainless steel, but may be constructed of any other materials with an adequate hardness factor that ranges from 48-58 HRC. A further ideal stainless steel is a 400 series stainless steel. The prongs 130 may be designed in different configurations; such has rounded ends, squared off ends, or pointed ends. The scraper is preferably defined by two prongs that are separated by a distance between one another in a range of ¼ inch to 1.0 inch. The handle 200 may consist of wood, plastics, stainless steel, alloys, composites, or any other materials known to a person skilled in the art. Preferably handle materials while be heat resistant to avoid melting on hot grills. The handle 200 may also be structured to be a square, rectangle, triangle, or any other geometric shape that a handle may employ.

This specification and the appended figures illustrate only typical embodiments or principles disclosed in this application, and therefore, are not to be considered limiting of its scope, for the invention may admit to other equally effective embodiments that will be appreciated by those reasonably skilled in the relevant arts. Any invention disclosed by this specification is defined by the claims. While the ideas herein disclosed has been described by means of specific embodiments and applications thereof, numerous modifications and variations could be made thereto by those skilled in the at without departing from the scope of the invention set forth in the claims.

I claim:

1. A method of cleaning a grill rod by:
   obtaining a grill cleaning tool comprising:
      a neck with a first end, a second end, a first side, a second side, a top plan, and a bottom plan;
      wherein the first end culminates with a U-shaped design comprising of two prongs and a scraper that are obtusely angled away from the bottom plan of the neck;
      wherein the second end is securely affixed to a handle;
      wherein the neck is further defined by a first concave contour and a second concave contour, said first concave contour provided on said first side of said neck between (a) said first and second ends and (b) said top and bottom plans, and said second contour provided on said second side of said neck between (a) first and second ends and (b) said top and bottom plans;
   applying one of said two prongs over the grill rod so that the grill rod is positioned between said two prongs;
   placing the scraper in contact with the grill rod;
   forcing the scraper along the length of the grill rod, whereby residue is dislodged.

2. The method of claim 1 wherein the grill cleaning tool is rotated to the right so that a second grill rod is provided into the first concave contour or left so that a third grill rod is provided into the second concave contour.

3. The method of claim 2 wherein the said scraper is in contact with a right side of the grill rod and a prong is in contact with a portion of a bottom side of the grill rod.

4. The method of claim 3 wherein the grill cleaning tool is pushed or pulled along the length of the grill rod.

5. The method of claim 2 wherein the said scraper is in contact with a left side of the grill rod and at least one prong is in contact with a bottom side of the grill rod.

6. The method of claim 5 wherein the grill cleaning tool is pushed or pulled along the length of the grill rod.

7. The method of claim 2 wherein said two prongs are angled away from the neck at approximately one-hundred and forty-five degrees.

8. The method of claim 1 wherein the scraper being used is formed from a 400 series stainless steel, whereby residue may be effectively removed from the grill rod with minimal damage to the scraper.

9. The method of claim 1 wherein the two prongs are separated by a distance between one another in a range of ¼ inch to 1.0 inch.

10. The method of claim 1 wherein said two prongs are angled away from the neck at approximately one-hundred and forty-five degrees.

\* \* \* \* \*